US009569677B2

(12) United States Patent
D'Addetta et al.

(10) Patent No.: US 9,569,677 B2
(45) Date of Patent: Feb. 14, 2017

(54) DEVICE AND METHOD FOR DIRECTING RADIATION IN THE DIRECTION OF AN OPTICAL ELEMENT OF AN IMAGE SENSING DEVICE OF A VEHICLE

(75) Inventors: Gian Antonio D'Addetta, Stuttgart (DE); Thomas Lich, Schwaikheim (DE); Thomas Friedrich, Freiberg A.N. (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1187 days.

(21) Appl. No.: 13/354,647

(22) Filed: Jan. 20, 2012

(65) Prior Publication Data
US 2012/0200704 A1 Aug. 9, 2012

(30) Foreign Application Priority Data

Feb. 8, 2011 (DE) .................. 10 2011 003 796

(51) Int. Cl.
*H04N 7/18* (2006.01)
*G06K 9/00* (2006.01)
*G06K 9/20* (2006.01)
*B60R 21/015* (2006.01)

(52) U.S. Cl.
CPC ..... *G06K 9/00845* (2013.01); *B60R 21/01538* (2014.10); *G06K 9/00805* (2013.01); *G06K 9/209* (2013.01)

(58) Field of Classification Search
None
See application file for complete search history.

(56) References Cited

U.S. PATENT DOCUMENTS

| 4,770,824 A | * | 9/1988 | Blom | B29D 11/00596 |
| | | | | 219/121.67 |
| 6,124,886 A | * | 9/2000 | DeLine et al. | 348/148 |
| 6,672,687 B2 | | 1/2004 | Nishio | |
| 2007/0223910 A1 | * | 9/2007 | Aoki et al. | 396/301 |
| 2009/0135253 A1 | * | 5/2009 | Augst | 348/148 |
| 2012/0062744 A1 | * | 3/2012 | Schofield et al. | 348/148 |
| 2014/0043479 A1 | * | 2/2014 | Busch et al. | 348/143 |

FOREIGN PATENT DOCUMENTS

| DE | 10158415 | 5/2002 |
| DE | 10 2004 037 871 | 3/2006 |
| DE | 10 2006 028 622 | 2/2007 |
| DE | 10 2008 031 445 | 1/2010 |

* cited by examiner

*Primary Examiner* — Heather Jones
(74) *Attorney, Agent, or Firm* — Norton Rose Fulbright US LLP; Gerard Messina

(57) ABSTRACT

A device for directing radiation in the direction of an optical element of an image sensing device of a vehicle. The device includes a central area for directing at least one portion of a first incident radiation onto the optical element. The device also includes at least one border area for directing at least one portion of at least one second incident radiation onto the optical element. The at least one second incident radiation runs in the opposite direction or at an obtuse angle with respect to the first incident radiation.

9 Claims, 4 Drawing Sheets

DEVICE AND METHOD FOR DIRECTING RADIATION IN THE DIRECTION OF AN OPTICAL ELEMENT OF AN IMAGE SENSING DEVICE OF A VEHICLE

CROSS REFERENCE

The present application claims the benefit under 35 U.S.C. §119 of German Patent Application no. DE 102011003796.9-51 filed on Feb. 8, 2011, which is expressly incorporated herein by reference in its entirety.

Field of the Invention

The present invention relates to a device and a method for directing radiation in the direction of an optical element of an image sensing device of a vehicle and a camera system for detecting a first incident radiation from a direction of the windshield of a vehicle and at least one second incident radiation from a direction of the interior of the vehicle.

Background Information

Video camera systems (mono video or stereo video) are used in vehicles for monitoring in the travel direction. Safety systems of the active type, e.g., automatic braking functions, are based mainly on these systems. In addition, video systems may also be provided in vehicles for monitoring the passenger compartment.

German Patent Application No. DE 10158415C2 describes a method for optical monitoring of the interior of a vehicle in which the passenger compartment of the vehicle is observed with the aid of at least one panoramic camera.

SUMMARY

Against this background, an example device for directing radiation in the direction of an optical element of an image sensing device of a vehicle, a corresponding example method and an example camera system for detecting a first incident radiation from a direction of the windshield of a vehicle and at least one second incident radiation from a direction of the interior of the vehicle are described. Advantageous embodiments are derived from the description below.

In accordance with the present invention, a single video camera system offers considerable improvements for simultaneous monitoring in the travel direction and in the direction of the occupant and may be used for optimal protection of the occupant. Thus, the advantages of a forward-directed camera for the forward-looking functions within the context of active safety and an interior camera focused primarily on occupant classification, occupant OOP detection (OOP=out of position), detection of drowsiness, etc. may be combined within the context of passive safety. In accordance with the present invention, only a single camera system is used which detects both the exterior and the interior. The corresponding functions may be implemented on this basis. These functions also include functions involving the forward-looking sensor system in addition to occupant classification and identification.

It is possible to detect both the interior and exterior by expanding the optical system of a video camera and through suitable adaptation of the detection range. In addition, it is possible to implement the functions used for these camera systems on this basis. These functions include occupant classification and identification of the seat position in the interior plus additional functions, for example, the seat belt engagement status, OOP determination, facial and drowsiness detection, etc. For the exterior, there are forward-looking functions, for example, vehicle identification, pedestrian detection, lane detection, traffic sign detection or activation of emergency brake systems and the like. For example, the camera angle required for the forward-looking functions may be expanded for this purpose, and this increased angle may be used for sensing the interior with the aid of a mirror. However, the resulting extra costs for a different lens system, a larger sensor, an additional algorithm, etc. are much lower than the costs of installing a separate camera for sensing the interior, for example.

The position and movements of the occupant may be evaluated by using occupant classification with the help of video-based systems to suppress airbag deployment, for example, or to alter the characteristics when the occupant is too close to the airbag. Conclusions about the size of the occupant may thus also be drawn, so that the airbag characteristic may also be adjusted. One goal is therefore to optimally adapt the passive safety device to the occupant in order to be able to protect him/her as well as possible. In conjunction with the detection of drivers under the influence of alcohol and corresponding Alcolock systems, there are conventional systems in which individual images of the driver are taken and the driver to be tested is ascertained by facial recognition and subsequent pattern comparison.

This yields an advantage that will reduce both the development costs and the costs of integration of such a system significantly. Through the present invention, both costs and space savings are possible because the integration and the required resources such as computation capacity for an additional interior camera are eliminated. The costs of the optical system are reduced accordingly and integration into a vehicle may be simplified. Some weight may thus also be saved by multiple uses of the sensor system. In addition, there is the possibility of creating additional functions because the behavior of the occupant may be related to the outside situation under some circumstances. As a result, this provides additional information about the potential event of an accident or a critical situation, for example, when approaching the tail end of a traffic jam or in a hazardous situation from the side, in which it is possible to detect the driver's response before the actual situation outside the vehicle. This means that a given system may be improved with regard to its functionality through the present invention. The present invention may allow the option of evaluating both the exterior and the interior areas and thus establishes a reference to the current driving situation. This may increase the robustness of the overall system, while reducing the susceptibility to errors. Driving safety is maximized with reduced effort and reduced costs.

In accordance with the present invention, an example device is provided for directing radiation in the direction of an optical element of an image sensing device of a vehicle, having the following features:

a central area for guiding at least one portion of a first incident radiation to the optical element; and at least one border area for directing at least one portion of at least one second incident radiation onto the optical element, the at least one second incident radiation running in the opposite direction or at an obtuse angle with respect to the first incident radiation.

The example device is designed to be installed at a suitable location in a vehicle such as near a front windshield of a motor vehicle, in particular a passenger vehicle or a truck. The radiation may be understood to be electromagnetic radiation in the form of light. The radiation runs in a beam path which strikes the device and from there reaches the optical element and the image sensing device. The optical element and the image sensing device may be installed in separate units or may be parts of a shared unit, for example, a camera, in particular a video camera. The optical element may have a lens or the like, and the image sensing device may have a suitable digital image sensor. The at least one portion of the first incident radiation may originate from a direction of the front windshield of a vehicle. The at least one portion of the at least one second incident radiation may originate from a direction of an interior of the vehicle and in particular from the driver's area and/or the passenger's area of the interior of the vehicle. In this context, the at least one portion of the respective radiation may mean that possible angles of incidence of the respective portion of the radiation are in a defined value range. The value range for the angles of incidence may be predefined generally by an aperture angle or a coverage angle of the optical element and/or the image sensing device. The surface portion of the first incident radiation on the optical element may be greater than the surface portion of the at least one second incident radiation on the optical element. The border area may be directly adjacent to the central area or may be at a distance from the central area. The border area and the central area may be areas of another optical element, for example, a mirror.

The central area here may be designed to be transparent. However, the at least one border area may be designed to be mirrored. Mirrored may be understood to be at least partially reflective for the incident radiation. Thus, the at least one border area may be a mirror element. The central area may be made of a transparent material. The central area may also be a clearance next to the border area or a gap between two neighboring border areas. Such a specific embodiment of the present invention offers the advantage that the at least one portion of the first incident radiation may reach the optical element unhindered and the at least one portion of the at least one second incident radiation may also reach the optical element from an opposite or almost opposite direction merely by reflection on the at least one border area.

The at least one border area may also be designed as a one-way mirror. A one-way mirror may be understood to be a component which reflects most of the incident radiation on a first side but allows most of the incident radiation to pass through on a second side. Thus, for example, the at least one border area in the embodiment as a one-way mirror may be designed to allow most of the first incident radiation to pass through and to reflect most of the second incident radiation. Such a specific embodiment of the present invention offers the advantage that the sensing area for the first radiation and thus for events from the direction of the windshield and beyond may be enlarged. In addition to the central area, the first incident radiation may also be directed at least partially through the at least one border area onto the optical element.

According to a particular specific embodiment, the device may have a glass element, the central area and the at least one border area being sections of the glass element. The glass element may have a curved glass panel, which is designed to be reflective for the at least one second incident radiation in at least one border area. In the central area, the glass is transparent for the first incident radiation. This offers advantages from the standpoint of production technology as well as with regard to integration and installation because, even prior to installation in a vehicle, the sensing area of the at least one border area may be defined through the curvature of the glass element and dimensioning of the at least one border area formed on the glass element. A precise alignment of the at least one border area in the already installed state may thus advantageously be omitted.

According to another specific embodiment, the device may have a switchable glass element, the central area and the at least one border area being sections of the switchable glass element, the switchable glass element being designed to switch the central area and the at least one border area between a transparent state and a mirrored state. An exemplary switchable glass element may typically include three components: a transparent substrate, an active switchable metal-hydrogen layer and a top layer, e.g., of palladium, which protects the active layer from oxidation and enables hydrogen dissociation. The active layer may contain, for example, magnesium and 3d transition mixed metal and may be made reversibly transparent through hydrogen absorption or chemical electrolysis, by applying an electrical current to the switchable glass element. Such a specific embodiment of the present invention offers the advantage that the device is usable more flexibly and in a more versatile manner because the central area and the at least one border area are reversibly adjustable in their transparency characteristics.

The central area and the at least one border area may be designed in the transparent state to guide the first incident radiation to the optical element, and the central area and the at least one border area may be designed in the mirrored state to direct the second incident radiation onto the optical element. Such a specific embodiment of the present invention offers the advantage that the sensing area or the value area for the angles of incidence is enlarged for the first incident radiation as well as for the at least one second incident radiation. Depending on the switching status of the switchable glass element, both the central area and the at least one border area are thus available for directing one of the two radiations onto the optical element.

An example control device may also be provided which is designed to switch the central area and the at least one border area jointly and periodically between the transparent state and the mirrored state. The control device may be understood to be, for example, a microprocessor, which may apply an electrical current to the switchable glass element according to a programmable regimen. The first incident radiation and the at least one second incident radiation may thus be directed alternately onto the optical element over the full combined sensing area of the central area and of the at least one border area. This makes it possible, on the one hand, for a sensor surface area of the image sensing device to be optimally utilized with a device designed in this way, while on the other hand, the flexibility is increased in view of the different sensing scenarios. In particular the vehicle interior may be observed over a larger area.

According to one specific embodiment, the device may have a first border area and a second border area, the central area being situated between the first and second border areas. In the installed state in a vehicle, the sequence may extend along an approximately horizontal line from the first border area, the central area, and the additional border area. One of the border areas may be provided for radiation from a driver's area and another of the border areas may be provided for radiation from a passenger's area. Such a specific embodiment of the present invention offers the advantage that both the driver's area and the passenger's area, in addition to an area of the windshield and an adjacent exterior area of the vehicle, may be monitored at low manufacturing and processing costs.

The present invention also provides a camera system for sensing a first incident radiation from the direction of the windshield of a vehicle and at least one second incident radiation from the direction of the interior of the vehicle, having the following features:

a device according to one specific embodiment of the present invention;

an optical element for guiding the first incident radiation and the at least one second incident radiation to the image sensing device; and the image sensing device for sensing optical information of the first incident radiation and optical information of the at least one second incident radiation.

A device according to the present invention may be used to advantage in conjunction with the camera system described above. The camera system may have a camera unit installed in a vehicle with a separate or integrated optical system. The camera system may have a video camera in particular. Optical information may be understood to be, for example, the light intensity of the corresponding radiation, the light intensity being convertible into analyzable electrical signals by the image sensing device or such a conversion being prepared.

The present invention also provides an example method for directing radiation in the direction of an optical element of an image sensing device of a vehicle, including the following steps:

guiding at least one portion of a first incident radiation to the optical element; and directing at least one portion of at least one second incident radiation onto the optical element, the at least one second incident radiation running in the opposite direction or at an obtuse angle with respect to the first incident radiation.

The steps of the example method according to the present invention may be performed or implemented in corresponding equipment of a device according to the present invention as described above. An object on which the present invention is based may also be achieved rapidly and efficiently through this embodiment variant of the present invention in the form of a method.

BRIEF DESCRIPTION OF THE DRAWINGS

The present invention is explained in greater detail below on the basis of the figures.

DETAILED DESCRIPTION OF EXAMPLE EMBODIMENTS

Figure 1:
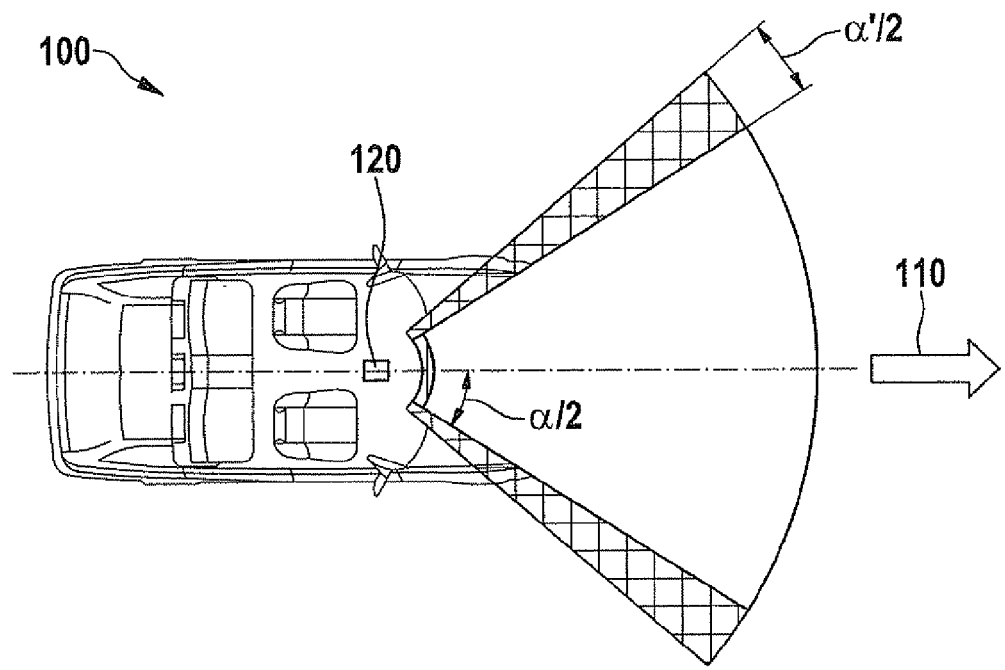
FIG. 1 shows a schematic top view of a vehicle having an enlarged camera sensing range according to one exemplary embodiment of the present invention.

In the following description of preferred exemplary embodiments of the present invention, the same or similar reference numerals are used for the elements depicted in the various figures, which also have a similar effect, so these elements will not be described again.

FIG. 1 shows a schematic top view of a vehicle 100 having an expanded camera sensing range according to one exemplary embodiment of the present invention. This shows a travel direction 110 of vehicle 100, a camera housing 120, a required sensing range for forward-looking functions, spanned by two times angle $\alpha/2$ and two adjacent areas which are additionally needed for sensing the interior, each being spanned by angle $\alpha'/2$. Both angles $\alpha/2$ proceed from a central longitudinal axis of vehicle 100. Camera housing 120 is situated in the area of the central longitudinal axis of vehicle 100. Camera housing 120 may contain a camera system, for example, a video camera system having a pre-crash sensor. The viewing direction of the camera of the camera system contained in camera housing 120 is centered essentially about travel direction 110.

This yields an enlarged sensing area, which is defined by the enlarged optical range of the camera contained in camera housing 120, this sensing area being spanned by an angle $\alpha+\alpha'$, and this sensing area being required for forward-looking functions spanned by two times angle $\alpha/2$ and the two additional areas required for sensing the interior, each being spanned by angle $\alpha'/2$. The two additional areas required for sensing the interior here enlarge the required sensing area for forward-looking functions on both lateral borders with respect to the central longitudinal axis of vehicle 100.

To ensure the aperture range of the camera optical system according to the present invention, required angle $\alpha$ for implementation of forward-looking functions is to be increased by angle $\alpha'$. This increased angle $\alpha'$ is then used for sensing the interior by using a modified inside mirror. The basic principle to be applied here is based on the fact that the enlarged optical range is used in the central area for the exterior sensing, whereas the laterally enlarged part of the optical system senses the interior via a mirror situated in the laterally enlarged part and aimed toward the rear.

Figure 2:
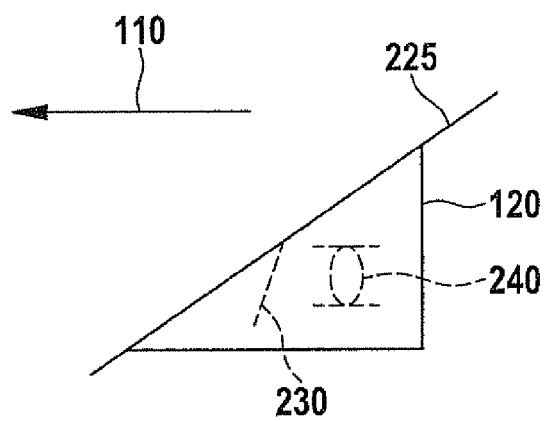
FIG. 2 shows a schematic side view of a camera system installed in a vehicle according to one exemplary embodiment of the present invention.

FIG. 2 shows a schematic side view of a camera system installed in a vehicle according to one exemplary embodiment of the present invention. This shows travel direction 110 of the vehicle, camera housing 120, a part of a windshield 225 of the vehicle, a mirror 230 and a lens system 240. Camera housing 120 is mounted on a part of the vehicle inside of windshield 225. Mirror 230 and lens system 240 are situated in camera housing 120. Lens system 240 may be a lens, for example, and additional optical elements.

Figure 3:
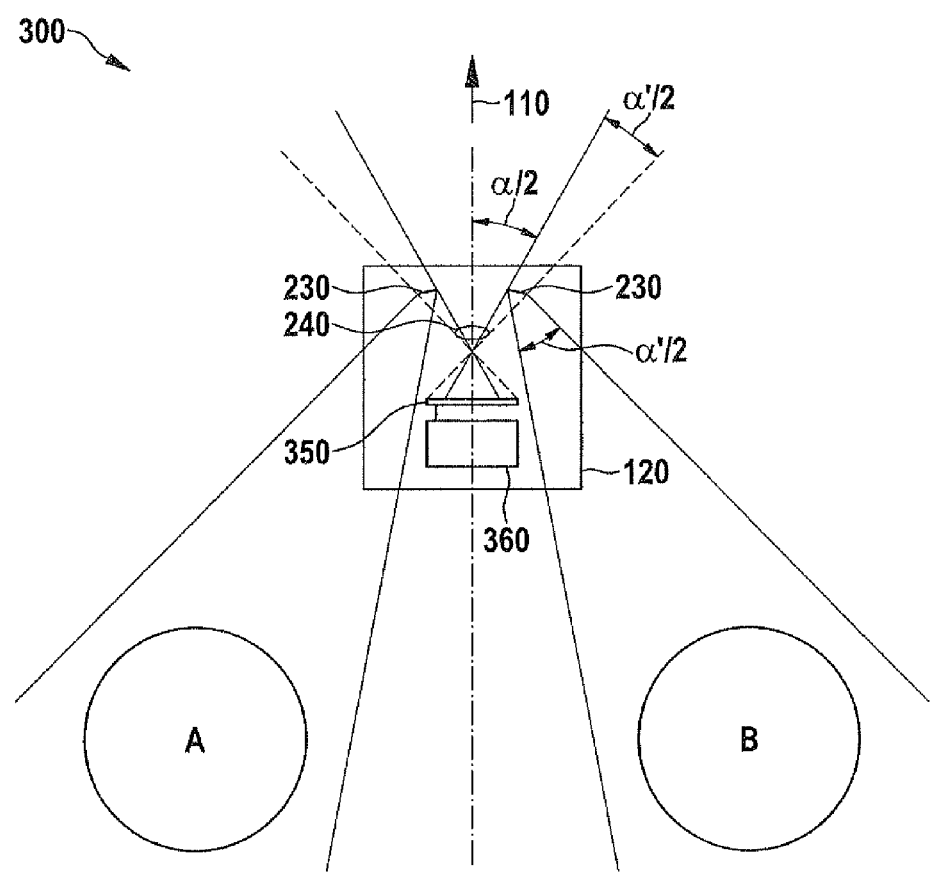
FIG. 3 shows a schematic top view of a camera system according to one exemplary embodiment of the present invention.

FIG. 3 shows a schematic top view of a camera system 300 according to one exemplary embodiment of the present invention. Camera system 300 here may be installed in a vehicle. Camera system 300 may be contained in the camera housing from FIG. 1 and FIG. 2, for example. Shown are travel direction 110 as an arrow directed upward, the central longitudinal axis of a vehicle as a vertical dash-dot line running centrally through camera system 300, camera housing 120, angle $\alpha/2$, angle $\alpha'/2$, two mirrors 230, lens system 240, an image sensing device or a sensor 350, a video processor 360, a driver A and a passenger B. Travel direction 110 is usually the forward travel direction of a vehicle.

Two mirrors 230, lens system 240, sensor 350 and video processor 360 are situated in camera housing 120. Camera system 300 has video processor 360, sensor 350, lens system 240 and the two mirrors 230 situated in this order along travel direction 110 and in the direction of the windshield of the vehicle. Sensor 350 is electrically connected to video processor 360. Sensor 350 receives radiation in the form of light and then outputs signals to video processor 360 in response to that. Video processor 360 is able to generate information in the form of an image from the signals from sensor 350.

A viewing direction of sensor 350 through lens system 240 runs along travel direction 110 of the vehicle. A first incident radiation may be incident from a direction opposite to travel direction 110 or obliquely to same. The first incident radiation originates here from an area of the windshield of the vehicle and/or from an area in the travel direction in front of the vehicle. A portion of the first incident radiation passes through lens system 240 and reaches sensor 350. Furthermore, a second incident radiation running in the travel direction or obliquely to same may also be incident. The second incident radiation originates from an interior of the vehicle. A portion of the second incident radiation strikes the two mirrors 230 and passes through lens system 240 to sensor 350.

Sensor 350 and lens system 240 are of such dimensions and are situated in relation to one another in such a way to yield a total aperture angle $\alpha+\alpha'$ of the camera optical system. FIG. 3 shows total aperture angle $\alpha+\alpha'$ between the two upper dashed lines. This total aperture angle $\alpha+\alpha'$ includes a coverage angle $\alpha$, which is directed in the travel direction and is bisected by the longitudinal axis of the vehicle, resulting in two halves $\alpha/2$ of coverage angle $\alpha$ directed in the travel direction. In FIG. 3, coverage angle $\alpha$, which is directed in the travel direction, runs between the two upper solid lines. The portion of the first incident radiation which is incident in directions from the area of coverage angle $\alpha$ directed in the travel direction reaches lens system 240 and sensor 350.

Total aperture angle $\alpha+\alpha'$ includes an additional coverage angle $\alpha'$, one half $\alpha'/2$ of which is connected to the area of coverage angle $\alpha$ on the left side and the other half is connected on the right side in FIG. 3. One of mirrors 230 is situated in the area of each half $\alpha'/2$ of additional coverage angle $\alpha'$. It may thus be stated that coverage angle $\alpha$ directed in the travel direction is spanned between opposing borders of mirrors 230. Mirrors 230 are inclined in their mirror planes with respect to the longitudinal axis of the vehicle, resulting in two halves $\alpha'/2$ of additional coverage angle $\alpha'$ projected by reflection from both halves $\alpha'/2$ of additional coverage angle $\alpha'$. For the sake of clarity, only the right half of these two halves is provided with a reference numeral in FIG. 3. Opening cones of the projected halves $\alpha'/2$ of additional coverage angle $\alpha'$ are now opened opposite or obliquely opposite to travel direction 110 due to reflection.

An area of driver A of the vehicle is situated in the opening cone of projected half $\alpha'/2$ of additional coverage angle $\alpha'$ shown at the left in FIG. 3. The area of passenger B of the vehicle is situated in the opening cone of projected half $\alpha'/2$ of additional coverage angle $\alpha'$ at the right in FIG. 3. The portion of the second incident radiation, which is incident in directions from the area of projected halves $\alpha'/2$ of additional coverage angle $\alpha'$, reaches lens system 240 and sensor 350 via mirrors 230.

In other words, FIG. 3 shows in a basic diagram the design of the optical system of camera system 300 in a top view. Mirrors 230 used for this purpose may be entirely normal mirrors and are then situated only in the border area of the lens system view angle, i.e., no mirrors 230 are present in the forward-looking viewing direction. Alternatively, however, semitransparent mirrors, so-called one-way mirrors, may also be used. These must be positioned in such a way that the interior is sensed. It is also possible that when using semitransparent mirrors or controllable mirrors, the viewing direction may be expanded in accordance with the exterior sensing. Details of these variants are discussed below.

Figure 4:
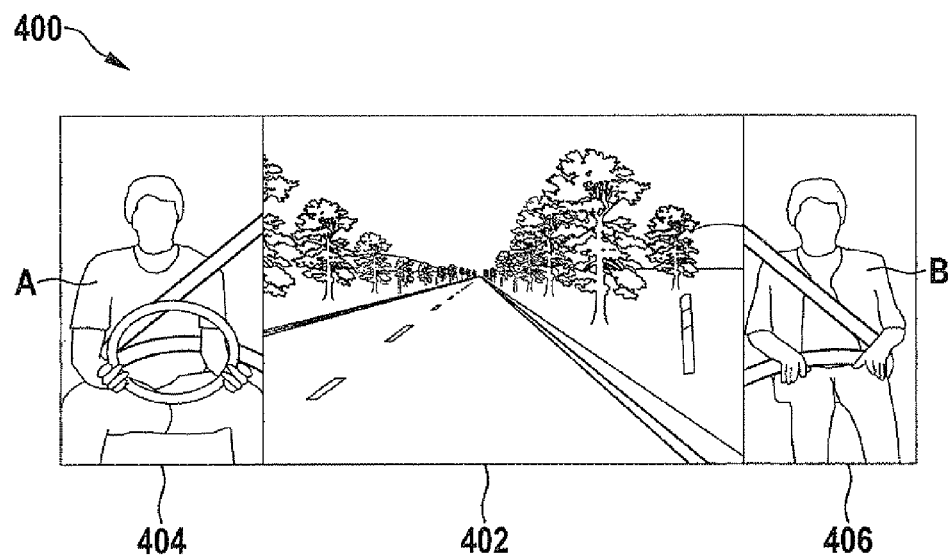
FIG. 4 shows a schematic diagram of an image sensed by a camera system according to one exemplary embodiment of the present invention.

FIG. 4 shows a schematic diagram of an image 400 captured with the aid of a camera system according to one exemplary embodiment of the present invention. This shows an outer area 402, a first inner area 404 and a second inner area 406. Outer area 402 shows a street layout. First inner area 404 shows a driver A. Second inner area 406 shows a passenger B. The image in 400 is subdivided into outer area 402, first inner area 404 and second inner area 406. Outer area 402 is situated between inner areas 404 and 406. Outer area 402 assumes a space in image 400, which is approximately the same as the sum of the spaces of the two inner areas 404 and 406 in image 400. The spaces of the two inner areas 404 and 406 in image 400 are of approximately the same size. Image 400 may be captured with the aid of a camera system, for example, such as the camera system shown in FIG. 3, FIG. 5 or FIG. 6.

The goal is thus to divide the image area into two or three areas, namely two inner areas 404, 406 and one outer area 402, as shown in FIG. 4 as an example. Accordingly the image is assembled through suitable hardware or software.

Figure 5:
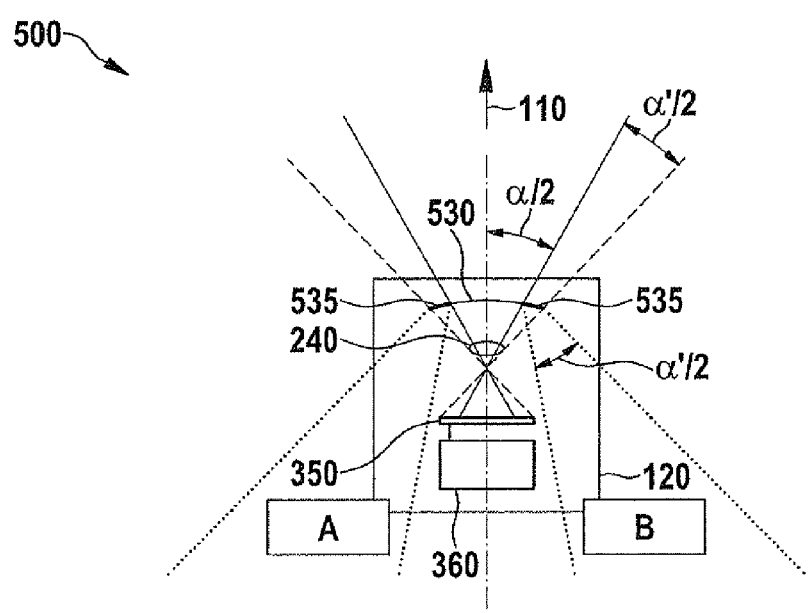
FIG. 5 shows a schematic top view of a camera system according to one exemplary embodiment of the present invention.

FIG. 5 shows a schematic top view of a camera system 500 according to one exemplary embodiment of the present invention. Camera system 500 corresponds to the camera system from FIG. 3 except for the mirrors. Camera system 500 in FIG. 5 additionally has a curved glass element 530, in the end areas of which, shown at the left and right, each has a mirror 535 mounted on a surface of glass element 530 facing sensor 350. As a result, the position and alignment of mirrors 535 correspond here to those from FIG. 3.

In summary, it may be stated that in this exemplary embodiment the space situated in front of video processor 360, as seen in a view toward the outside, may be equipped with a concave glass surface, glass element 530, which ensures the silvering in the form of two one-way mirrors 535 on the side facing video processor 360 through vapor deposition of a metal oxide layer in the border areas, as shown in FIG. 5. In the central area, the glass is transparent as usual and thus allows the forward-looking function of camera system 500. This has advantages from the standpoint of production technology as well as integration and installation.

Figure 6:
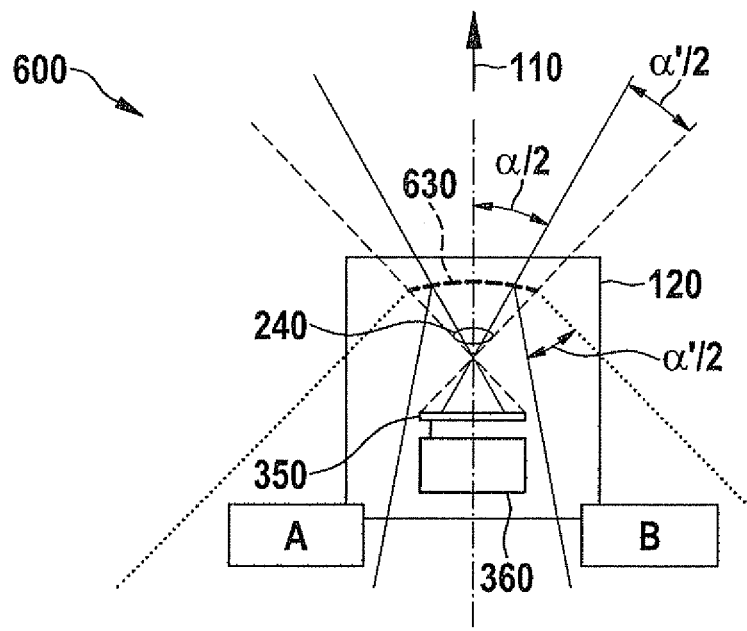
FIG. 6 shows a schematic top view of a camera system according to one exemplary embodiment of the present invention.

FIG. 6 shows a schematic top view of a camera system 600 according to one exemplary embodiment of the present invention. Camera system 600 corresponds to the camera system from FIG. 3 and the camera system from FIG. 5 except for the mirrors and the resulting effects on the beam path. Camera system 600 in FIG. 6 has a switchable mirror, i.e., a switchable glass element 630 instead of the two mirrors 230 from FIG. 3 and glass element 530 as well as two mirrors 535. Switchable glass element 630 may be switched as a whole between a transparent state and a reflective state. For this reason, the additional coverage angle $\alpha'$ may be omitted. The coverage angle $\alpha$, which is directed in the travel direction and is spanned between the solid lines, provides coverage in the travel direction in the transparent state of switchable glass element 630. In the reflective state of switchable glass element 630, however, coverage angle $\alpha$, which is directed in the travel direction, is projected onto switchable glass element 630 at a coverage angle directed counter to the travel direction, this angle being spanned between the dotted lines. This coverage angle, which is also directed counter to the travel direction, serves to cover areas of driver A and/or of passenger B of the vehicle. All other statements made in FIG. 3 and FIG. 5 also retain their validity with respect to FIG. 5.

In this exemplary embodiment, the glass element in front of video processor 360 may also be implemented as the switchable mirror 630 in a transparent/mirrored switchable form. In this case, the switchable glass element, i.e., the switchable mirror 630, would be energized with the aid of a control device (not shown) and would then allow a view toward the inside as well as a view toward the outside in alternation at certain scanning rates, as shown in FIG. 6. In this case, the implementation takes place no longer via a metal oxide layer vapor deposited onto the glass but instead via alternative options. A typical switchable mirror 630 includes three components: a transparent substrate, an active switchable metal hydrogen layer and a top layer (palladium) which protects the active layer from oxidation and allows hydrogen dissociation. The active layer, e.g., magnesium and 3d transition mixed metal, becomes reversibly transparent through hydrogen absorption or chemical electrolysis. In this case, the aperture range of the camera optical system need not be enlarged but instead may be retained as is; the only difference is that the switchable mirror 630 must be installed and energized accordingly.

Figure 7:
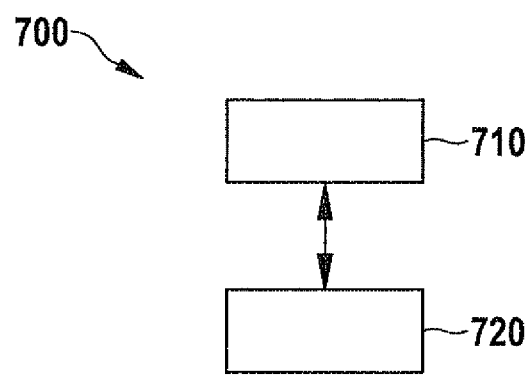
FIG. 7 shows a flow chart of a method according to one exemplary embodiment of the present invention.

FIG. 7 shows a flow chart of a method 700 for directing radiation in the direction of an optical element of an image sensing device of a vehicle according to one exemplary embodiment of the present invention. Method 700 has a step of directing 710 at least one portion of a first incident radiation onto the optical element. Furthermore, method 700 has a step of directing 720 at least one portion of at least one second incident radiation onto the optical element, the at least one second incident radiation running in the opposite direction or at an obtuse angle with respect to the first incident radiation. The radiation directed onto the optical element may be detected by the optical element and subsequently evaluated.

The exemplary embodiments shown in the figures and described here are selected only as examples. Different exemplary embodiments may be combined with one another completely or with respect to individual features. One exemplary embodiment may also be supplemented by features of another exemplary embodiment.

What is claimed is:

1. A camera device of a vehicle, comprising:
    a camera arrangement, including:
        a camera housing;
        an image sensor; and
        an optical element contained in the camera housing;
        wherein the camera housing includes: (i) a central area for guiding at least one portion of a first incident radiation to the optical element; and (ii) at least one border area for directing at least one portion of at least one second incident radiation onto the optical element, the at least one second incident radiation running one of in an opposite direction or at an obtuse angle with respect to the first incident radiation,
        wherein the central area is transparent or mirrored and the at least one border area is mirrored or transparent, and
        wherein the camera arrangement is configured to be positioned so as to face the front windshield in the vehicle to provide to the image sensor a forward-looking exterior view via the central area or the at least one bordered area and to provide to the image sensor a rearward-looking interior view via the at least one bordered area or the central area.

2. The device as recited in claim 1, wherein the at least one border area is a one-way mirror.

3. The device as recited in claim 1, wherein the central area and the at least one border area are sections of a glass element.

4. The device as recited in claim 1, wherein the central area and the at least one border area are sections of a switchable glass element, the switchable glass element able to switch the central area and the at least one border area between a transparent state and a mirrored state.

5. The device as recited in claim 4, wherein the central area and the at least one border area are switched to the transparent state to guide the first incident radiation to the optical element, and the central area and the at least one border area are switched to the mirrored state to direct the second incident radiation onto the optical element.

6. The device as recited in claim 4, further comprising:
    a control device configured to switch the central area and the at least one border area jointly and periodically between the transparent state and the mirrored state.

7. The device as recited in claim 4, wherein the at least one border area includes a first border area and a second border area, wherein the central area is situated between the first border area and the second border area.

8. A camera system for sensing a first incident radiation from a direction of a windshield of a vehicle and at least one second incident radiation from a direction of an interior of the vehicle, comprising:
    a housing;
    an image sensing device contained in the housing for sensing optical information of a first incident radiation and optical information of at least one second incident radiation; and
    an optical element contained in the housing for directing the first incident radiation and the at least one second incident radiation to the image sensing device;
    wherein the housing includes (i) a first central area for guiding at least one portion of the first incident radiation to the optical element, and (ii) at least one border area for directing at least one portion of the at least one second incident radiation onto the optical element, the at least one second incident radiation running one of in an opposite direction or at an obtuse angle with respect to the first incident radiation,
    wherein the central area is transparent or mirrored and the at least one border area is mirrored or transparent, and
    wherein the camera arrangement is configured to be positioned so as to face the front windshield in the vehicle to provide to the image sensor a forward-looking exterior view via the central area or the at least one bordered area and to provide to the image sensor a rearward-looking interior view via the at least one bordered area or the central area.

9. A method for directing multiple radiations in a direction of an optical element contained in a housing of a camera device, having an image sensor, of a vehicle, the method comprising:
    guiding, via a first central area of the housing, at least one portion of a first incident radiation to the optical element and the image sensor; and
    directing, via at least one border area of the housing, at least one portion of at least one second incident radiation onto the optical element and the image sensor, the at least one second incident radiation running one of in an opposite direction or at an obtuse angle with respect to the first incident radiation, wherein the central area is transparent or mirrored and the at least one border area is mirrored or transparent, and wherein the camera arrangement is configured to be positioned so as to face the front windshield in the vehicle to provide to the image sensor a forward-looking exterior view via the central area or the at least one bordered area and to provide to the image sensor a rearward-looking interior view via the at least one bordered area or the central area.

* * * * *